United States Patent [19]
Jablonski

[11] 3,764,573
[45] Oct. 9, 1973

[54] PREPARATION OF PREPREGS
[75] Inventor: Richard J. Jablonski, Scotia, N.Y.
[73] Assignee: General Electric Company, Schenectady, N.Y.
[22] Filed: Oct. 29, 1970
[21] Appl. No.: 85,248

[52] U.S. Cl... 260/30.4 N, 260/31.4 R, 260/33.2 R, 260/37 N
[51] Int. Cl......................... C08g 51/34, C08g 51/32
[58] Field of Search..................... 260/30.4 N, 37 N, 260/78 UA, 31.4, 33.2

[56] References Cited
UNITED STATES PATENTS
3,562,223  2/1971  Bargain et al.................. 260/78 UA
3,352,832  11/1967  Barr et al....................... 260/78 UA
3,518,219  6/1970  Lavin et al..................... 260/37 N X FOREIGN PATENTS OR APPLICATIONS
1,555,564  1/1969  France........................... 260/78 UA Primary Examiner—Lewis T. Jacobs
Attorney—Howard I. Schlansker, Frank L. Neuhauser, Oscar B. Waddell and Joseph B. Forman

[57] ABSTRACT

Resin-bonded composite materials having improved high temperature characteristics are provided by utilizing theta solvents for the resin.

10 Claims, No Drawings

PREPARATION OF PREPREGS

This invention relates to the preparation of resin-bonded composites and to resin solutions and prepregs for preparing such composites. More particularly, it relates to such composites which are readily prepared and which are characterized by the use of specially chosen solvents which enhance such high temperature characteristics.

The resins used as binders in conjunction with the present invention are typified by those described in French Pat. No. 1,555,564. According to this patent, N,N'-bisimides of unsaturated dicarboxylic acids are reacted with a primary amine to provide prepolymer materials having improved thermal characteristics in their fully cured state. More specifically, a bisimide having the formula

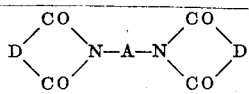

in which D is a divalent radical containing a double carbon-carbon bond and A is a divalent radical containing at least two carbon atoms is reacted with a primary diamine of the formula $$H_2N - B - NH_2$$

in which B is a divalent radical having not more than 30 carbon atoms. A and B can be identical or different and may a linear or branched alkylene radical having less than 13 carbon atoms, a cycloalkylene radical having in the ring five or six carbon atoms, a heterocyclic radical containing at least one of the atoms O, N or S, an aromatic or polycyclic aromatic radical, these various radicals having no substituents which provide side reactions under operating conditions. A and B can also be polyaromatic or polyalicyclic radicals bonded together with divalent groups or atoms such as oxygen or sulfur, alkylene groups having from one to three atoms of carbon, the radicals $-NR_4-$, $-P(O)R_3-$, $-N=N-$,

$-CO-O-$, $-SO_2-$, $-SiR_3R_4-$, $-CONH-$, $-NY-CO-X-CO-NY-$, $-O-CO-X-CO-O-$,

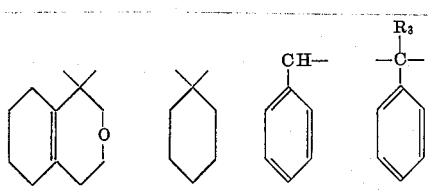

in which $R_3$, $R_4$ and Y represent an aliphatic radical having from one to four atoms, carbon or a cycloaliphatic radical having five or six atoms of carbon in the aromatic or polyaromatic ring and X represents an alkylene substituted or unsubstituted radical having less than 13 carbon atoms, a cycloaliphatic radical having five or six carbon atoms in the ring or a mono- or polycyclic radical.

The group D is derived from an ethylenic anhydride with the general formula

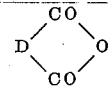

which may be, for instance, maleic anhydride, citraconic anhydride, tetrahydrophthalic anhydride, itaconic anhydride, as well as the products of the Diels-Alder reaction between a cyclodiene and one of these anhydrides.

Among the type (I) N,N'-bisimides that may be used are the following:

N,N'-ethylene-bismaleimide
N,N'-hexamethylene-bismaleimide
N,N'-metaphenylene-bismaleimide
N,N'-4,4'-diphenylmethane-bismaleimide
N,N'-4,4'-diphenylether-bismaleimide
N,N'-4,4'-diphenylsulfone-bismaleimide
N,N'-4,4'-dicyclohexylmethane-bismaleimide
N,N'-α-α-4,4'-dimethylene cyclohexane-bismaleimide
N,N'-metaxylylene-bismaleimide
N,N'-4,4'-diphenylcyclohexane-bismaleimide The following are examples of the type (II) diamines which may be used:

diamino-4,4'-dicyclohexylmethane
diamino-1,4-cyclohexane
diamino-2,6-pyridine
metaphenylene diamine
paraphenylene diamine
diamino-4,4'-diphenylmethane
bis(amino-4-phenyl)-2,2-propane
benzidine
diamino-4,4'-phenyl oxide
diamino-4,4'-diphenyl sulfide
diamino-4,4'-diphenylsulfone
bis(amino-4-phenyl) diphenyl silane
bis(amino-4-phenyl)methylphosphine oxide
bis(amino-3-phenyl)methylphosphine oxide
bis(amino-4-phenyl)phenylphosphine oxide
bis(amino-4-phenyl)phenylamine
diamino-1,5-naphthalene
metaxylene diamine
paraxylene diamine
bis(paraaminophenyl)-1,1 phthalene
hexamethylene diamine
Piperazine is also useful.

According to the patent, the amounts of N,N'-bisimides and diamines are chosen so that the ratio of the number of moles of N,N'-bisimides to the number of moles of diamine is at least equal to one but it is generally preferable that it be less than 50.

Solvents which can be used according to the French patent are inert polar medium such as dimethylformamide, N-methylpyrrolidone, and dimethylacetamide, the reaction in such solvents making possible the direct production of solutions with a high solids content. The preparation is carried out in bulk by heating the previously mixed reagents depending upon the physical condition of the reagents, the conventional techniques for mixing finely divided solids to be used or, alternatively, dispersion or dissolution of one reagent into the other maintained in a liquid state. It is often advantageous to heat the mixture of the two reagents first at a moderate temperature in the order of 100 °C to 200°C for a few minutes to a few hours, the prepolymer thus obtained then being used in a solution in solvents such as those mentioned above, or in suspension in an inert medium. The prepolymer can also be shaped by mere hot casting or even be used in powder form. In a second stage, the prepolymer can be hardened by heating at temperatures up to 350°C, finally under pressure. The mixture can also be shaped directly into the desired structure and hardening effected by heating again, eventually under pressure.

The resins thus prepared are insoluble, cannot be melted and offer a remarkable resistance to thermal stress, have good dielectric characteristics and excellent stability with respect to chemical reagents. They can be converted into films or multicellular materials, or used for metal bonding. They are attractive for making laminated products with mineral fibers or molded parts which contain fibrous or powder fillers. Examples given in the above French patent include the following, the flexural tests being carried out according to ASTM D790, the tensile tests according to ASTM D 882-61 T, and the dielectric tests according to ASTM D 150-69 T.

EXAMPLE I 15 g of N,N'-4,4'-diphenylmethane-bismaleimide is added to 8.29 g of bis(amino-4-phenyl)methane preheated to 120°C. The mixture is stirred and held at 120°C for 1 hour. After cooling the compound obtained is crushed and dissolved in 52.3 cc of N-methylpyrrolidone. Part of the solution is poured on a glass plate; thickness of the layer is 200. The whole is heated to 120°C for 1 hour, then to 180°–190°C for the same duration. After cooling, a film is obtained (thickness: 70$\mu$), exhibiting the following characteristics at 25°C: Tensile strength 11.7 kg/mm$^2$; elongation at rupture 5 percent.

EXAMPLE II

The same process as in Example I is applied to 33 g of the same diamine and 59.16 g of the same bisimide, heating the mixture at 120°C for 10 minutes, then the hot liquid mixture is poured in a rectangular mold (125 mm × 6 mm × 75 mm) heated at 120°C.

The whole is heated to 200°C in 30 minutes and held at that temperature for 1½ hours. After removal from the mold, the plate is subjected to a complementary heat treatment of 15 hours at 200°C, then cut into test pieces (length 37.5, width 9.57 mm) which exhibit a resistance to flexion rupture of 16.2 kg/mm$^2$ for a beam length of 25.4 mm.

EXAMPLE III

The same process as in Example II is applied to 33 g of the same diamine and 89.5 g of the same bisimide.
a. Part of the hot liquid mixture is poured in cylindrical molds (diameter 54 mm, height 6 mm); hardening is effected as in Example II. Molded parts exhibit the following characteristics at 25°C:

|  | Initial | After 113 hours at 250°C |
|---|---|---|
| Dielectric constant at 50 Hz | 3.8 | 3.5 |
| Tan $\delta$ | 2 10$^{-3}$ | less than 10$^{-3}$ |
| Resistivity (ohms-cm) | 2 10$^{14}$ | 2 10$^{15}$ | b. Another part of the hot liquid mixture is treated as in Example II. The test pieces exhibit at 25°C a resistance to flexion rupture of 20 kg/mm$^2$ for a beam length of 25.4 mm. After thermal stress at 250°C for 1465 hours, the flexion resistance has kept 67 percent of its initial value.

EXAMPLE IV 78.4 g of N,N'-4,4'-diphenylmethane-bismaleimide are added to 21.7 g of bis(amino-4-phenyl) methane preheated to 130°C. The mixture is stirred and held at 130°C for 30 minutes. After cooling and crushing, 93.1 g of the compound thus obtained is dissolved into 106.1 g of N-methyl pyrrolidone. With 79 g of the solution, 3600 cm$^2$ of satin type glass cloth are coated, after the cloth has first received a heat treatment and a treatment by $\gamma$-aminopropyltriethoxysilane; it has a specific weight of 308 g/m$^2$. The coated cloth is dried at 90°C for 3 hours under reduced pressure (10 mm Hg), 16 samples 150 mm × 150 mm are cut and stacked in a laminate. This stack is compressed at 30 kg/cm$^2$ and held in this compression while gradually raising the temperature to 200°C. After removal from the mold, the laminate is gradually heated to 250° C in 70 hours. After cooling, it exhibits at 25°C the following characteristics:
Resin content: —20.9 percent
Resistance to flexion rupture, initial —65 kg/mm$^2$
after 232 hours at 250°C:—74 kg/mm$^2$

EXAMPLE V

The same process as in Example II is applied to 90.2 g of the same bisimide and 9.8 g of the same diamine preheated to 150°C, heating the mixture at 150°C for 5 minutes before molding by pouring. The complementary heat treatment is effected at 230°C for 50 hours. Test pieces exhibit at 25°C a resistance to flexion rupture of 13.3 kg/mm$^2$; after 169 hours at 300°C, it is 9.5 kg/mm$^2$.

EXAMPLE VI

A thorough mixture is made with:
45.15 g of N,N'-4,4'-diphenylmethane-bismaleimide
9.90 g of bis(amino-4-phenyl) methane
10 grams of this mixture are heated at 200°C for 5 minutes. After cooling the prepolymer is crushed and placed in a mold identical to that used for Example II. The mold is heated to 195°C at a pressure of 25 kg/cm$^2$, then held for one hour at 195°–205°C under a pressure of 100 kg/cm$^2$. After removal from the mold and cooling, the molded bar exhibits at 25°C a resistance to flexion rupture of 8.6 kg/mm$^2$ for a beam length of 25.4 mm.

EXAMPLE VII

The same process is used as in Example VI with 48.24 g of N,N'-metaphenylene-bismaleimide and 12 g of bis(amino-4-phenyl) ether.
The mold is heated to 195°C in 35 minutes at low pressure, so-called contact pressure, than held at 195°–200°C for 1 hour at 100 kg/cm$^2$. The resistance to flexion rupture of the bar is 12.2 kg/mm$^2$.

EXAMPLE VIII

The same process is used as in Example VI with 64.3 g of N,N'-metaphenylene-bismaleimide and 15.8 g of bis(amino-4-phenyl) methane.

The molded part has a resistance to flexion rupture of 12 kg/mm².

EXAMPLE IX

The test described under Example VI is repeated with
32.4 g of N,N'-4,4'-diphenylether bismaleimide and
6 g of bis(amino-4-phenyl) ether.

The mold is heated to 180°C in 20 minutes under 25 kg/cm², then from 180° to 200°C in one hour under 100 kg/cm² pressure. This bar has a resistance to flexion rupture of 10 kg/mm².

EXAMPLE X 10 g of N,N'-metaphenylene bismaleimide are added while stirring in 15 minutes to a solution prepared from 400 cc of dimethylformamide and 4.3 g of hexamethylene diamine. Part of the solution is poured on a glass plate; the whole is dried at 150°C for 15 hours. After cooling, a flexible and strong film is obtained with a thickness of 35μ.

EXAMPLE XI

A mixture is made with
85 g of N,N'-4,4'-diphenylcyclohexane bismaleimide
45 g of dimethylformamide
39.6 g of bis(amino-4-phenyl) methane and heated at 150°C for 15 minutes. After sudden cooling, the solution obtained is used for making a laminate as described in Example IV, which exhibits excellent mechanical characteristics.

Using resins of the general above described type as binders for composites made from prepreg materials, when the solvents used are those solvents used for resin preparation such as N-methylpyrrolidone, dimethylformamide, dimethylacetamide, and cyclohexanone, several difficulties are experienced in the production of the prepregs or resinimpregnated layers from which such laid-up composites or laminates are prepared. Generally speaking, in the preparation of prepregs, a solids level of about 40 percent by weight or above is necessary from economic considerations. However, usually the viscosity of such impregnating solutions using the above solvents is often rather high and even more important the rate of viscosity increase with time is so rapid as to severely limit the shelf life of the impregnating solution or varnish. It will be realized, of course, that such high viscosity or increases in viscosity inhibit adequate saturation of any substrate in the prepreg material and prevent uniform and reproducible resin and solvent pickup by the substrate. Furthermore, the above-mentioned solvents, which are present in the prepreg as a result of the coating operation, are very polar in nature. These, and other highly polar solvents, adhere strongly to the resin since it, too, is very polar. This resulting attractive force between polar resin and polar solvent makes removal of such solvent from the prepreg very difficult. Thus, such solvent is likely to be trapped within the final composite during the fabrication process. It will be realized, of course, that such entrapped solvent results in final composite materials possessing poor elevated temperature properties.

From the above it will be quite evident that there is a need for prepreg solvents which will provide stable, low viscosity solutions having the requisite economic content of resin binder and which at the same time will be efficiently removed from the prepreg during the preparation of the final composite. It is a primary object of this invention to provide such resin solutions and prepregs and composite materials made therefrom.

Those features of the invention which are believed to be novel are set forth with particularity in the claims appended hereto. The invention will, however, be better understood and further objects and advantages appreciated from a consideration of the following description.

Briefly, according to the present invention, there are provided very specific solvents which, in conjunction with the resin, make possible high solids content impregnating materials of stable viscosity which can be used to efficiently coat and impregnate substrate materials for the preparation of prepregs, which latter in turn can be laid up to provide final cured composite materials or structures which are possessed of good high temperature characteristics.

It has been unexpectedly found that if a so-called "theta solvent" for the particular resin binder is used, all of the above qualities can be attained. Specifically, there are attainable through the use of such theta solvents coating and impregnating solutions of high solids content which have good shelf life and will efficiently coat and impregnate a chosen substrate. These solvents, during the preparation of composite structures, are efficiently removed from the prepregs so that they do not detract from the final high temperature properties of the composite structure.

Briefly stated, theta solvents are those which, with a particular resin, produce above a particular "theta" temperature a true, clear solution. Below such so-called theta temperature there exists a cloudy or non-transparent solution which is still homogeneous and suitable for the preparation of prepregs and which may be said to consist at one and the same time of a solution of the theta solvent in the particular resin and a solution of the resin in the theta solvent. The theoretical basis of theta solvent is described in *Principles of Polymer Chemistry*, Paul J. Flory, Cornell University Press, Ithaca, New York, 1953, at pages 600 through 602, in Chapter 13 and elsewhere in this work. In brief, however, it can be stated from a theoretical basis that viscosities of theta solutions will be lower than viscosities of true solutions at the percent solids level described above and, also, that removal of a theta solvent from a resin will be easier than removal of a true solvent from the same resin.

The following examples will illustrate the practice of the present invention, it being realized that they are not to be taken as limiting in any way.

Solutions of resins in theta solvents are readily prepared simply by placing the resin in the solvent and stirring vigorously. The viscosity stability of the solutions of the present invention are illustrated by the examples set forth in Table I below. The particular resin used was that set forth in Example VI of the above French patent. Solutions of the indicated percent by weight solids content indicated in the table were prepared by combining with vigorous stirring the resin concerned with, as solvents, N-methylpyrrolidone, dimethylformamide, cyclohexanone and dimethylacetamide. Portions of the solution were placed in a Gardner Holt viscosity tube and the viscosity in stokes taken at 72'F immediately after preparation or at zero days and after the expiration of the times in days indicated. Also prepared in an exactly similar manner were solutions prepared using so-called theta solvent for the resin including dioxolane, 1,4-dioxane, 2-methoxyethyl acetate and 1,2-dimethoxyethane. Additionally, there were prepared solutions using 80 percent 2-methoxyethyl acetate and 20 percent xylene or 20 percent toluene.

be realized that the solvent content can be lowered, if desired, by more extended air drying, or more conveniently by oven drying. In the particular example, the prepreg where dried at room temperature for 18 hours, when heated at 95°C for 5 minutes, had a solvent con-

TABLE I.—VISCOSITY DATA

|  | Ex. | Solvent | Percent solids | Viscosity (stokes) after indicated days | | | | | | |
|---|---|---|---|---|---|---|---|---|---|---|
|  |  |  |  | 0 | 3 | 5 | 10 | 14 | 20 | 28 |
| True solvents | A | N-methylpyrrolidone | 40 | 0.9 | 1.1 | 1.3 | 2.0 | 2.6 | 4.4 | 8.1 |
|  | B | do | 45 | 1.7 | 5.5 | 20.0 | 22.7 | 98.5 | | |
|  | C | do | 50 | 4.4 | 9.8 | | 27.0 | 148.0 | | |
|  | D | Dimethylformamide | 40 | <0.5 | 0.7 | | 1.3 | | Gel | |
|  | E | do | 45 | 0.9 | 1.6 | | 5.5 | 12.2 | | |
|  | F | do | 50 | 0.9 | 1.6 | | 8.8 | Gel | | |
|  | G | Cyclohexanone | 40 | 27.0 | 148.0 | Gel | | | | |
|  | H | do | 45 | 63.4 | 1066.0 | Gel | | | | |
|  | I | Dimethylacetamide | 50 | 2.1 | ᵃ 5.3 | ᵇ 12.9 | | | | |
| Theta solvents | J | Dioxolane | 40 | <0.5 | <0.5 | <0.5 | <0.5 | <0.5 | <0.5 | <0.5 |
|  | K | do | 50 | 1.3 | | 1.6 | 2.0 | 2.3 | 2.5 | 3.2 |
|  | L | 1,4-dioxane | 40 | 0.9 | | 1.0 | 1.3 | 1.3 | | 1.4 |
|  | M | do | 45 | 2.2 | | 3.0 | 3.3 | 3.7 | | 4.5 |
|  | N | do | 50 | 4.9 | | 7.5 | 8.2 | 8.8 | | 10.7 |
|  | O | 2-methoxyethyl acetate | 45 | 0.7 | | | 0.8 | 0.9 | | 1.0 |
|  | P | do | 50 | 1.3 | | | 1.7 | 2.3 | | 2.6 |
|  | Q | 1,2-dimethoxyethane | 40 | <0.5 | | <0.5 | | <0.5 | | |
|  | R | do | 45 | <0.5 | | <0.5 | | <0.5 | | |
|  | S | do | 50 | 0.5 | | <0.5 | | <0.5 | | |
| Theta solvents plus diluent | T | 80% 2-methoxy ethyl acetate/20% xylene | 50 | 1.7 | 1.8 | 2.0 | 2.3 | 2.6 | 3.2 | 4.0 |
|  | U | do | 50 | 1.7 | 1.8 | 2.0 | 2.3 | 2.6 | 3.2 | 4.0 |

ᵃ 4 days.   ᵇ 7 days.

From the foregoing Table I it will be immediately evident that resin solutions prepared according to Examples J through U using theta solvents or mixtures of theta solvents with non-solvents have a much better viscosity stability than those using true solvents as in Examples A through I. The tremendous advantage attained in using such theta solutions will also be appreciated when it is realized that they can be stored without deterioration as to viscosity for extended periods of time an used when needed in the preparation of prepregs, the substrates of which are thoroughly and intimately coated and impregnated with the low viscosity impregnant. Any suitable substrate desired can be used. Included are fibers of various types including but not limited to glass, quartz, graphite, carbon, boron, asbestos, metals, high temperature fibers including high temperature synthetic fibers including polyamides as well as fabrics and other forms made from such fibers. Other base materials include platy materials such as mica including flake mica, mica paper and mica dust. In general, any base capable of being resin-treated can be utilized including powders and other permeable structures.

The prepregs of the present invention are prepared very readily. Typically, in using glass cloth as the substrate, the cloth is merely dipped into the impregnating solution and drawn through wiper bars, the gap between the wiper bars determining the desired amount of resin and solvent pickup by the substrate. For example, 181E–A1100 glass cloth dipped into a 50 percent solids solution of the resin in dioxane and pulled through wiper bars with a 14 mil gap contains 32.8 percent by weight resin. The resin content is determined by weighing the impregnated prepreg, hanging in a forced air oven at 250°C for 1 hour and then weighing.

The loss in weight represents the amount of solvent in the prepreg. The dried prepreg is then placed into a muffle furnace at 650°C for 4 hours to burn the resin from the glass, the loss in weight representing the weight of resin in the prepreg. In the above-mentioned prepreg, the solvent content after drying for 18 hours at room temperature was 10.1 percent by weight. It will tent of 7.3 percent, and when heated at 95°C for 15 minutes had a solvent content of 5.4 percent.

In the preparation of graphite prepregs, the graphite filaments are typically laid parallel to each other and the impregnating varnish poured onto the filaments Preferably, a protective film is then laid over the filaments and the varnish spread evenly about the filaments by rolling pressure. In a particular instance, graphite filaments, specifically Modmor II (63 tows about 18 inches in length), are laid parallel to one another and 55 g of a 50 percent solution of resin in dioxane poured onto the filaments. Rolling pressure applied to a film placed over the filaments insured even distribution after which the protective film is removed and the prepreg placed in an oven to adjust the solvent level to the desired value. In particular, the above prepreg placed in a 90°C oven for 10 minutes had a solvent content of 14.3 percent by weight.

Composites are prepared from the above prepregs in any accepted manner. Typically, the prepreg to be fabricated is cut to the desired size and the desired number of pieces of prepreg placed on upon the other, the lay-up so obtained being placed in a press at ambient temperature and heat and pressure applied. Typically, within from about 15 minutes to 1.5 hours, the temperature of the composite is raised to 145°C to 180°C, with a pressure ranging from 150 psi to 300 psi being applied over this time period. The composite is held at a temperature of from about 170°C to 180°C for about 1 hour and removed after the temperature has dropped to about 100°C or less. The composite is then typically post-baked for from about 13 to 24 hours at temperatures ranging from about 135°C to 260°C. In a typical specific composite preparation, prepregs prepared from a 50 percent solids solution of the above specific resin in 2-methoxyethyl acetate using a substrate of 181E–A1100 glass cloth and having a solvent content of 6.6 percent by weight and a resin content of 31.8 percent was cut to a size of 3 × 6 inches. Twelve plies or pieces of the prepreg were laid up and placed in a press at room temperature and contact pressure and heat applied. Within 55 minutes the temperature of the lay-up reached about 154°C and there was applied a pressure of 150 psi. After 15 minutes more, the temperature was about 174°C and a temperature of 174°C to 177°C was maintained for one hour. The composite was cooled in the press to room temperature and removed, the final composite having a thickness of 105 mils. The composite was then post-baked for 16 hours at 250°C. Shown in Table II below are the results of physical testing on various composites prepared, using typical prior art solvents and the theta solvents of the present invention. All composites were made according to the immediately preceding specific examples using the substrate indicated except that the post bake is as indicated in the table. The flexural strength and the flexural modulus were tested according to ASTM D790.

What I claim as new and desire to secure by Letters Patent of the United States is:

1. A solution of resin obtained by reacting an unsaturated bisimide of the formula

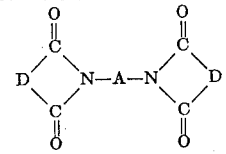

in which D is a divalent radical containing a carbon—carbon= and A is a divalent radical containing at least

TABLE II

| Example | Solvent | Prepreg percent solvent | Prepreg percent resin | Post bake Time | Post bake Temp. (°C.) | Test temp., °F. | Flexural strength (p.s.i.) | Flexural modulus (p.s.i.×10⁻⁶) | Percent retention of flexural strength | Percent retention of flexural modulus |
|---|---|---|---|---|---|---|---|---|---|---|
| 181E-A-1100 GLASS CLOTH | | | | | | | | | | |
| 1 | Dimethylformamide | 6.2 | 28.9 | 4 / 4 / 17 | 135 / 200 / 250 | 72 / 400 | 52,900 / 30,800 | 2.56 / 1.76 | 58 | 69 |
| 2 | Dimethylacetamide | 7.6 | 30.4 | 4 / 4 / 17 | 135 / 200 / 250 | 72 / 400 | 66,700 / 33,900 | 2.69 / 2.06 | 51 | 77 |
| 3 | N-methylpyrrolidone | 4.2 | 32.0 | 24 | 260 | 72 / 400 | 93,000 / 44,800 | 3.63 / 2.72 | 48 | 75 |
| 4 | do | 8.6 | 32.0 | 24 | 260 | 72 / 400 | 78,200 / 18,300 | 3.47 / 1.77 | 23 | 51 |
| 5 | Dioxane | 8.5 | 32.0 | 24 | 260 | 72 / 400 | 74,800 / 63,400 | 3.32 / 3.02 | 85 | 92 |
| 6 | do | 10.0 | 35.0 | 24 | 232 | 72 / 400 | 70,900 / 71,000 | 3.59 / 3.31 | 100 | 92 |
| 7 | 2-methoxyethyl acetate | 6.6 | 31.8 | 15 | 250 | 72 / 400 | 81,500 / 67,100 | 3.47 / 3.30 | 82 | 94 |
| 8 | do | 5.2 | 36.0 | 16 | 250 | 72 / 400 | 79,500 / 67,000 | 3.42 / 2.89 | 84 | 84 |
| GRAPHITE | | | | | | | | | | |
| 9 | Dioxane | 11 | | 16 | 232 | 72 / 400 | 231,900 / 212,000 | 18.4 / 18.0 | 91 | 98 |
| 10 | do | 18 | | 16 | 232 | 72 / 400 | 206,000 / 174,200 | 13.7 / 14.9 | 85 | 108 |
| 11 | N-methylpyrrolidone | 7.9 | | 21 | 260 | 72 / 400 | 233,000 / 47,600 | 15.0 / 6.2 | 20 | 41 |

From the foregoing table it will be quite evident that not only do the theta solvents of the present invention enable the preparation of improved resin solutions and prepregs, but that they also make possible the provision of composite materials which have far and away superior flexural strength and flexural modulus at elevated temperatures. Such composites are particularly adaptable to applications where high temperature strength is required such as in aerospace and gas turbine applications, and other uses where high temperature strength is required.

In a similar manner composites can be prepared using other reinforcing agents. For example, four sheets of reconstituted mica paper were coated with solution P of Table I above, the solvent content being lowered by drying in an oven at 95°C for 15 minutes. A prepreg fabricated by laying up the mica paper sheets and pressing over a period of about 1 hour at a maximum temperature of 400°F and a maximum pressure of 200 psi, produced a composite having good strength and rigidity. A composite similarly prepared using in lieu of the mica paper a high temperature polyamide paper, specifically Nomex paper, using eight plies resulted in a composite which was very strong and possessed of good flexibility. There are prepared, then, by the teaching of this invention composite materials which are possessed of superior strength and flexural modulus at elevated temperatures.

two carbon atoms with a diamine of the formula $$H_2N - B - NH_2$$

in which B is a divalent radical of not more than 30 carbon atoms in a molar ratio of bismide to diamine of between 1.2:1 and 50:1 in a theta solvent for said resin.

2. A solution as in claim 1 wherein said solvent comprises at least 80 percent by volume dioxane.

3. A solution as in claim 1 wherein said solvent comprises at least 80 percent by volume 2-methoxyethyl acetate.

4. A solution as in claim 1 wherein said solvent comprises at least 80 percent by volume 1,2-dimethoxyethane.

5. A solution as in claim 1 wherein said solvent is diluted with up to about 20 percent by volume of a hydrocarbon solvent.

6. A prepreg of base material impregnated with the solution of claim 1.

7. A prepreg as in claim 6 in which said base material is of glass fiber.

8. A prepreg as in claim 6 in which said base material is of graphite fiber.

9. A prepreg as in claim 6 in which said base material is of high temperature resistant fiber.

10. A prepreg as in claim 6 in which said base material is micaceous.

* * * * *